US005925266A

United States Patent [19]

Gagne

[11] Patent Number: 5,925,266

[45] Date of Patent: Jul. 20, 1999

[54] MOUNTING APPARATUS FOR INDUCTION COUPLED PLASMA TORCH

[75] Inventor: Peter H. Gagne, Brookfield, Conn.

[73] Assignee: The Perkin-Elmer Corporation, Norwalk, Conn.

[21] Appl. No.: 08/950,775

[22] Filed: Oct. 15, 1997

[51] Int. Cl.[6] .................................................... B23K 10/00

[52] U.S. Cl. ................................ 219/121.48; 219/121.52; 219/121.51; 315/111.51; 356/316

[58] Field of Search ......................... 219/121.52, 121.48, 219/121.51, 121.54, 75, 121.59; 313/231.31, 231.41; 315/111.21, 111.51; 356/316

[56] References Cited

U.S. PATENT DOCUMENTS 4,482,246 11/1984 Meyer et al. ........................... 356/316
4,766,287 8/1988 Morrisroe et al. ................. 219/121.52
5,200,595 4/1993 Boulos et al. ..................... 219/121.52

*Primary Examiner*—Mark Paschall
*Attorney, Agent, or Firm*—David Aker; Herbert S. Ingham

[57] ABSTRACT

In a mounting apparatus for an induction coupled plasma generator, a housing assembly has a receptacle with a central opening aligned over a housing wall opening, electrical contact rings in the receptacle, and a gas block with a central aperture aligned with the openings. An outer passage in the gas block receives a plasma forming gas and extends to the central aperture. A mounting assembly has a mounting member with an annular contact ring, a second gas block, and a gas tube and a sample tube extending from the second gas block. The second gas block has an inner passage extending into the gas tube. The mounting assembly removably engages to the housing assembly, with the mounting member on the receptacle, the second gas block in the first gas block, and the rings in contact. The tubes extend to a load coil for the plasma, and the passages align to convey the plasma forming gas into the gas tube. Provision is made for axial adjustment of the mounting assembly to position the tubes axially with respect to the coil.

46 Claims, 5 Drawing Sheets

MOUNTING APPARATUS FOR INDUCTION COUPLED PLASMA TORCH

This invention is related to induction coupled plasma generators and particularly to mounting apparatus for such generators.

BACKGROUND

Induction coupled plasma (ICP) generators typically are used for spectroscopy, treatment of fine powders, melting of materials, chemical reactions and the like. These applications derive from the high temperatures inherently associated with a plasma, which are high enough to effect electron excitation and ionization of the plasma gas and injected materials. Plasma generation also is utilized to produce ions utilized in instruments for mass spectroscopy and, at low pressure, for vapor deposition processes. ICP generators are driven by high frequency electronic oscillators by coupling through a load coil, broadly in the radio frequency range of 10 to 100 MHz. A problem associated with the high frequency is radiation that can interfere with auxiliary equipment such as radios, computers and videos and related control equipment.

ICP generators generally are enclosed in a housing compartment that serves several purposes including isolating the plasma from atmospheric air, protecting personnel from light radiation and containing radio frequency radiation. The generator includes tubes for conveying a plasma forming gas through the coil, and for introducing sample material into the plasma. Such sample is derived from a source such a nebulizer that generally is mounted outside of the housing compartment for protection against the heat of the plasma. There is a need to service and substitute components of the plasma generator including the tubes and the nebulizer or other sample source. In existing apparatus the housing must be opened for procedures inside such as removal and replacement of components, which is cumbersome because the gas and sample tubes extend into the coil.

A problem may occur if the tip of the sample injection tube is not located precisely, particularly in the case of an organic solvent being used to carry dissolved sample material. Heat from the plasma discharge can cause a carbon deposit to form on the tip if the tip is to close to the base of the plasma. This deposit interferes with analytical performance by causing the injector to block the flow of sample to the plasma. On the other hand, if the tip is too far from the plasma, the sample disburses too much and goes around the plasma instead of into it. It is difficult to find a proper position without significant trial and error, requiring disassembly each time. Thus, there is a need for adjustment of the axial position of gas tubes with respect to a plasma-forming load coil during operation, in order to optimize the tip location.

An object of the invention is to provide a novel mounting apparatus allowing easy removal and replacement of components of an induction coupled plasma generator. Another object is to provide a mounting assembly of such components which is easily removed from and replaced in a housing assembly. A further object is to provide such removal and replacement without tools. Yet another object to provide such a mounting apparatus with shielding of radio frequency emission. Another object is to provide such a mounting apparatus that allows adjustment of axial position of gas tubes with respect to a plasma-forming load coil, during plasma generation. Another object is to provide a mounting apparatus that allows for automatic contacting of a spark or high frequency starting lead during the replacement.

SUMMARY

The foregoing and other objects are achieved, at least in part, by a mounting apparatus for an induction coupled plasma generator, wherein the apparatus comprises a housing assembly, a mounting assembly and engagement means for removably engaging the mounting assembly to the housing assembly. The housing assembly includes a housing, a load coil mounted in the housing, and a receptacle affixed to the housing wall essentially outside of the housing and having a central opening aligned with the coil axis and a wall opening. An annular first electrical contact element is affixed to the receptacle. A first gas block has a central aperture therethrough. An attachment means is provided for attaching the first gas block to the housing wall with the central aperture aligned with the central opening. The first gas block has an outer passage therein receptive of a plasma forming gas and extending to the central aperture. The load coil is receptive of radio frequency energy, and the housing wall, the receptacle and the first contact element are electrically conductive and in mutual electrical contact.

The mounting assembly includes a mounting member configured to fit to the receptacle, an annular second electrical contact element affixed to the mounting member, a second gas block affixed to the mounting member and configured to fit into the first gas block in the central aperture, and a gas tube affixed to the second gas block to extend therefrom. The second gas block has an inner passage extending therethrough into the gas tube, and the mounting member and the second contact element are electrically conductive and in mutual electrical contact.

The housing assembly and the mounting assembly are configured cooperatively such that, with engagement, the mounting member is fitted to the receptacle, the second gas block is fitted into the first gas block, the first contact element and the second contact element are in electrical contact, the gas tube extends coaxially to the load coil, the inner passage aligns with the outer passage to convey the plasma forming gas into the gas tube to the load coil, and the load coil and the gas tube are cooperatively positioned to effect a plasma by induction coupling of the plasma forming gas with the radio frequency energy.

For sample injection into the plasma, the mounting assembly further comprises a sample injector tube affixed through the mounting member so as to extend coaxially into the gas tube. The injector tube is receptive of sample material for injection into the plasma. The sample source, such as a nebulizer assembly, may be retained on the mounting member with the injector tube extending from the sample source so as to inject sample material into the plasma. Preferably the mounting member has a tubular protrusion projecting over the injector tube in the gas tube, the protrusion having an axial bore with a sufficiently high ratio of length to diameter to provide a wave guide beyond cutoff for radio frequency shielding.

In a further embodiment, the mounting assembly is adjustable to provide for axial positioning of the gas tube relative to the load coil. For this, the engagement means comprises positioning means for selective axial positioning of the mounting assembly relative to the housing assembly, and rotation retaining means for retaining the mounting assembly in a fixed rotational position relative to the housing assembly. The first contact means and the second contact means are cooperative to remain in electrical contact independently of the axial positioning. The attachment means comprises holding means for holding the first gas block to the housing wall in a fixed position rotationally with freedom of axial positioning relative to the housing wall, and urging means for urging the first gas block axially to a seating position on the second gas block independently of the axial positioning such that the inner passage remains aligned with the outer passage.

DETAILED DESCRIPTION

Figure 1:
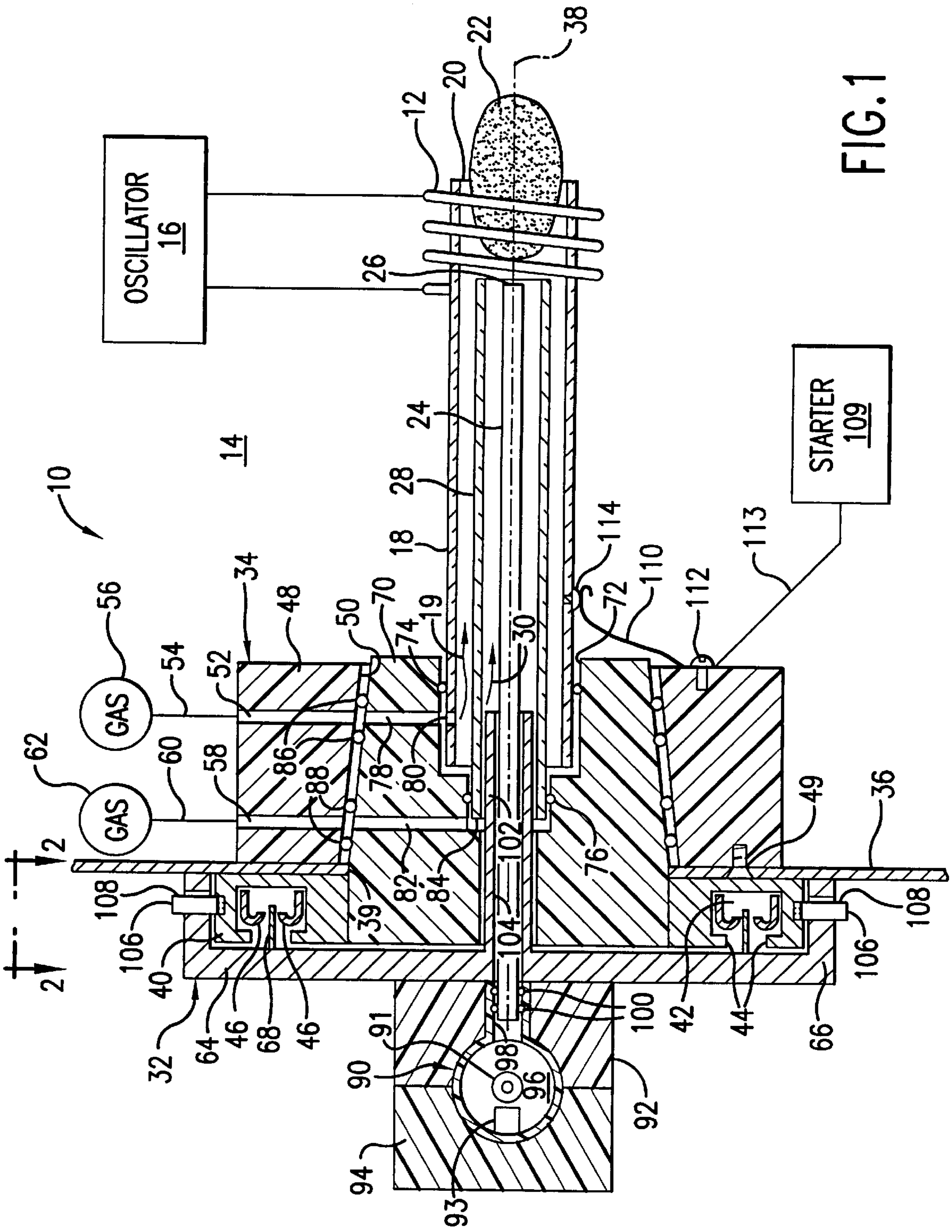
FIG. 1 is a longitudinal section of an embodiment of an apparatus of the invention.

The present apparatus 10 (FIG. 1) is adapted to an otherwise conventional induction coupled plasma system such as is used with an atomic emission spectrophotometer (e.g. a Perkin-Elmer Optima™3000, Optima 4000 or P-500), or a mass spectrographic instrument (e.g. a Perkin-Elmer Elan ®). The system includes a load coil 12 mounted in a torch housing 14 which is closed for radio frequency shielding and may contain an inert gas where the plasma is generated. The coil is receptive of radio frequency energy, generally from an oscillator circuit 16 having a radio frequency of, for example, 27 MHz. A suitable circuit is described in U.S. Pat. No. 4,766,287 (Morrisroe et al.), but the nature or details of the oscillator are not important to this invention. The coil may form a part of the oscillator circuit.

A gas tube 18 of quartz glass or other material that is non-conductive (at radio frequency) extends to and typically a short distance through the load coil 12. A plasma forming gas 19 such as argon is passed through the tube to exit at the coil end 20 of the tube. With induction coupling of the gas with the radio frequency energy by way of the coil, a plasma discharge 22 is formed at the end. If the plasma is used to effect radiation for spectroscopy, or to treat a material, a sample injector tube 24 (of material similar to that of the gas tube) is positioned coaxially in the gas tube with its end 26 proximate the coil. Preferably, for control of gas flow, an intermediate tube 28 (of material similar to that of the gas tube) is disposed coaxially between the gas tube and the injector tube, with the plasma forming gas 19 being conveyed in the gas tube outside of the intermediate tube. An auxiliary gas 30, which may be the same type as the primary gas, may be conveyed inside of the intermediate tube and outside of the injector tube to a point near the end of the injector tube.

The invention is directed to incorporating some of the aforementioned components into a mounting assembly 32 which can be removably engaged with a housing assembly 34 comprising a housing wall 36 and other fixed components of the apparatus. In the housing assembly, the load coil 12 is mounted by ordinary connections to the oscillator circuit 16 which in turn has a conventional mounting (not shown) directly to the housing. The coil has an axis 38 extending centrally through a circular opening 39 in the wall 36 of the housing. A ring shaped receptacle 40 is affixed to the housing wall essentially outside of the housing.

An annular first contact element is retained in an outwardly facing annular slot 42 in the receptacle 40 by annular shoulders 44 protruding partially over the slot. (As used herein and in the claims, the terms "outward" and "outwardly" refer to a facing direction outside and away from the housing, and "inward" and "inwardly" refer to a facing direction into the housing.) The contact element may be formed of a pair of opposing finger rings 46 made of spring material, of the type conventionally used for shielding radio frequency radiation. Other means may be utilized for contacting, such as a simple ring, but the contact system should be effective for radio frequency shielding. The housing wall 36, the receptacle 40 and the contact element 46 are electrically conductive (generally metallic) and are in electrical contact with each other (directly or indirectly) and grounded.

Further to the housing assembly 34, a first gas block 48 has an attachment 49 to the housing wall 36 adjacent to the receptacle 40, preferably inside the wall. The attachment for this embodiment may be with screws (one shown) or any other appropriate means such as adhesive. The block has a cylindrical central aperture 50 therethrough aligned with the wall opening 39. This cylindrical aperture advantageously has a taper to a smaller diameter further into the housing. The gas block may be attached directly to the housing wall or indirectly by way of direct attachment to the receptacle; in the latter case the receptacle or the block (or both) is (are) attached to the wall. Attachments (not shown) are made conventionally, such as with screws into threaded components.

There may be structural variations in the wall mountings that are functionally equivalent to the present illustration. For example the actual wall may terminate at the edge of the receptacle with a flange attaching to the circumference of the receptacle. In such cases, for the purposes herein including the claims, the wall is deemed to include the inward facing surface of the receptacle, with the first gas block 48 affixed directly to that inner face. Also, the receptacle may thereby actually be located within the bounds of the wall as though the wall was indented, and the term "essentially outside of the housing" includes such a configuration.

The gas block 48 has a first outer passage 52 extending laterally through the block to the central aperture 50. The outer end of the passage is receptive of the plasma forming gas 19 by a gas line 54 via a conventional gas regulator and valve (not shown) to a source 56 of the gas. If an auxiliary gas 30 is used, there is a second, auxiliary outer passage 58 similarly extending from a gas line 60 and a gas source 62 to the central opening 50.

The mounting assembly 32 includes a mounting member 64 configured to fit on the receptacle 40, for example having a shallow cup shape with an outer rim 66 that fits over the receptacle. An annular second contact element is retained on the mounting member and is adapted to contact the first contact element. In the case of the first contact element being formed of a pair of finger rings 46, the second means is a band 68 that inserts between the finger rings so as to be electrically contacted thereby. (In construction the band may be formed as part of the mounting member.) Alternatively, with a simpler first contact ring, the second contact, for example, may also be a simple flat ring, with due consideration for sufficient shielding as indicated above.

A second gas block 70 is affixed coaxially to the mounting member by any suitable means (not shown) such as screws. This block has a central bore 72 with the gas tube 18 held therein at one end with an o-ring 74 so as to extend coaxially from the bore. The auxiliary tube 28, if used, also is affixed in the inner block in a narrowed portion of the bore with an o-ring 76. The second block 70 and the tube have a first inner passage 78, including a hole 80 in the side wall of the gas tube 18, that extends laterally inward into this tube. A second, auxiliary inner passage 82 also extends laterally into the bore 72 so as to direct the gas into the auxiliary conduit 28, conveniently at inner end 84 of this conduit. The injector tube 24, if used, is retained coaxially through the mounting member 64 and the inner block 70 to extend through the auxiliary tube to the coil 12. It will be appreciated that the lateral passages do not need to extend entirely radially, and may be directed as appropriate within the respective blocks to connect conveniently with gas sources.

The second block 70 is configured to fit into the outer gas block 48, with the first inner passage 78 aligned with the first outer passage 52 to convey the plasma forming gas into the gas tube 18. Similarly, the auxiliary inner passage 82 is aligned with the auxiliary outer passage 58 to convey the auxiliary gas into the auxiliary tube 28. Two pairs of o-rings 86, 88 set in grooves in the outer surface of the second block seal the respective passages. The tapering of mating surfaces of the two blocks allows easy removal. The material of the gas blocks is not critical, hard plastic tolerant of radio frequency being suitable. However, metal should not be too close to the coil.

The injector tube 24 extends from a source of sample material, such as a spray chamber 96 in a conventional nebulizer assembly 90, or a powder feeder with carrier gas. Typically, in the spray chamber of a nebulizer housing there is a sample orifice 93 located proximate a tube 91 with an orthogonal gas jet orifice, the orifices being offset laterally from the ICP axis 38. The nebulizer assembly or other source may be retained on the mounting member 64 or the second gas block 70 by any suitable means such as with screws, clamping or (as shown) a bracket formed of a fixed portion 92 secured permanently to the member and a removable portion 94 attached with clamps and/or screws to allow replacement of the nebulizer. The spray chamber 96 communicates with a short sleeve 98 extending from the nebulizer. The injector tube is held in the sleeve with a pair of o-rings 100 so as to convey nebulized sample from the nebulizer chamber into the plasma. To further limit escape of radio frequency radiation, the mounting member has an electrically conductive tubular protrusion 102 projecting part way to the coil, over the injector tube in the gas tube. The protrusion has an axial bore 104 with a sufficiently high ratio of length to diameter to provide a wave guide beyond cutoff for radio frequency shielding to conform with radio frequency interference codes. To effect this the ratio should be at least 8:1.

Figure 2:
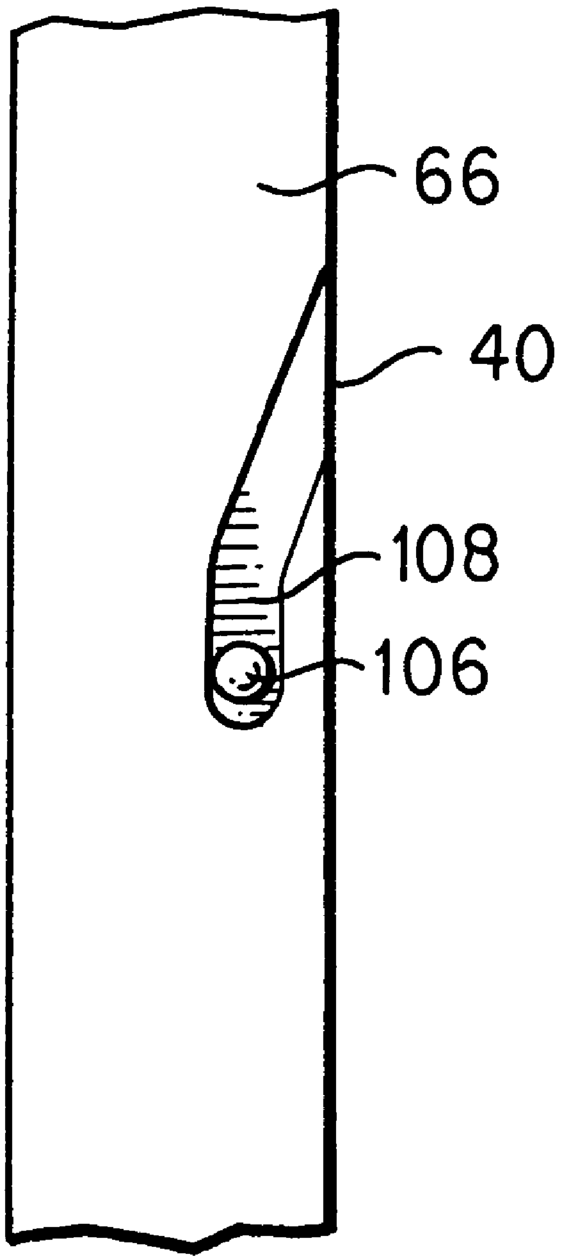
FIG. 2 is a side view at 2—2 of FIG. 1.

The mounting assembly 32 is removably engaged to the housing assembly 34 with any practical means such as removable screws, clamps, threading of the rim and receptacle (for rotational engagement), or the like. A suitable means (FIG. 2) utilizes two or more arcuately spaced pins 106 protruding radially outward from the receptacle 40. Corresponding open, angled slots 108 in the rim 66 of the mounting member allows rotational engagement with easy removal. With the mounting assembly engaged, the mounting member 64 is fitted on the receptacle 40, the second gas block 70 is fitted into the first gas block 48, the second contact element 68 electrically contacts the first contact element 46, the gas tube 18 extends coaxially to the load coil 12, the inner passages 78, 82 align respectively with the outer passages 52, 58 to convey the gases into the gas tube so as to exit at the load coil, and the load coil and the gas tube are cooperatively positioned to effect the plasma 22 by induction coupling of the plasma forming gas with the radio frequency energy. Escape of radio frequency radiation is effectively limited.

A conventional spark or high frequency pulse from a starter generator 109 is used to initiate the plasma. The pulse may be directed into the gas tube 18 by way of a spring clip 110 held to the fixed gas block 48 by a screw 112 that attaches to a lead 113 from the starter. When the mounting assembly is engaged, the clip contacts a metal contact 114 imbedded in or on the conduit wall. The starter connection thus is made automatically as the mounting assembly is inserted into the housing assembly.

Components and surfaces of the apparatus advantageously are cylindrical, particularly the mounting member, the central aperture and the second gas block, so that the engaging means can rotationally engage the mounting means to the receptacle. However, if other engaging means are used such as slip clamps or thumb screws, such components and surfaces may be any other desired configuration such as oval or square in cross section.

Figure 3:
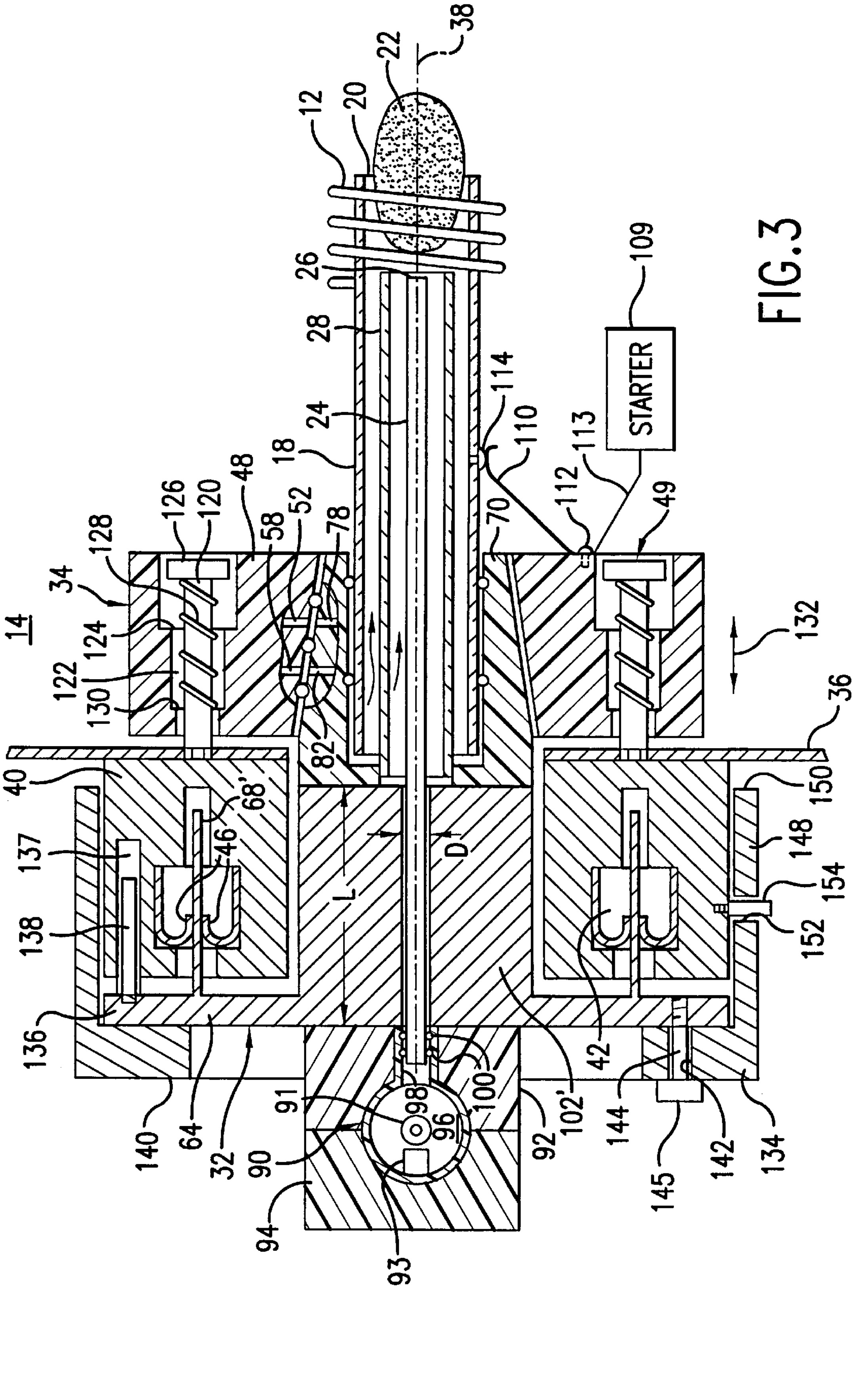
FIG. 3 is a longitudinal section of another embodiment of an apparatus of the invention.
Figure 4:
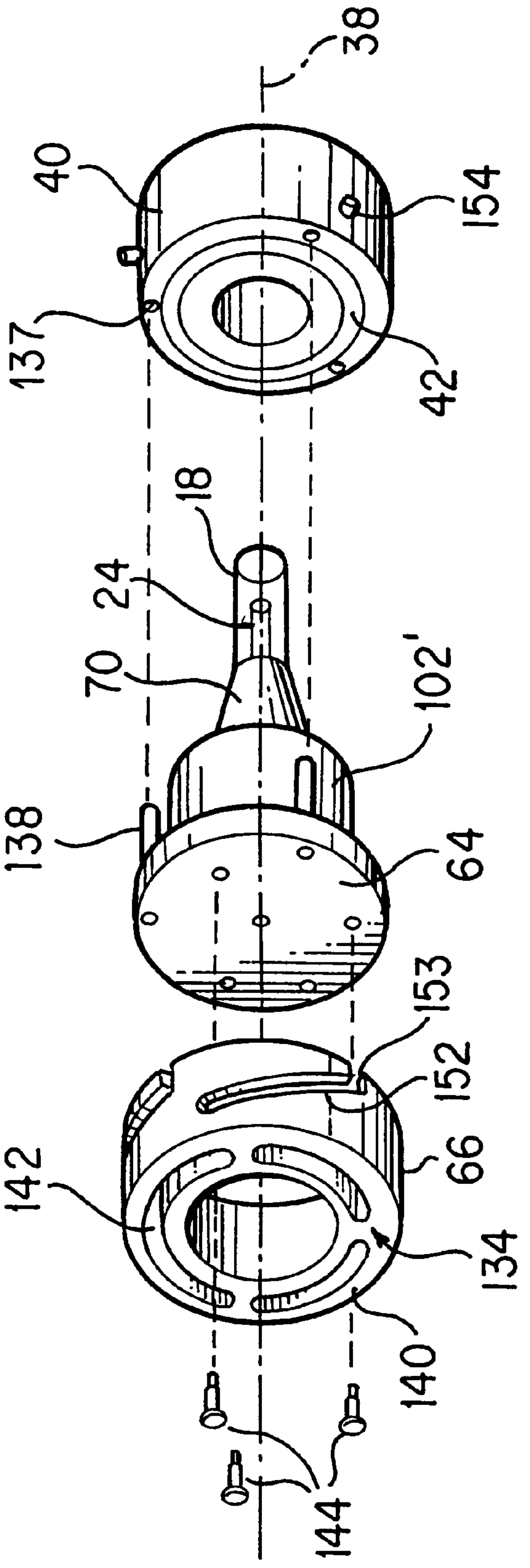
FIG. 4 is an exploded perspective view of a portion of the apparatus of FIG. 3.
Figure 5:
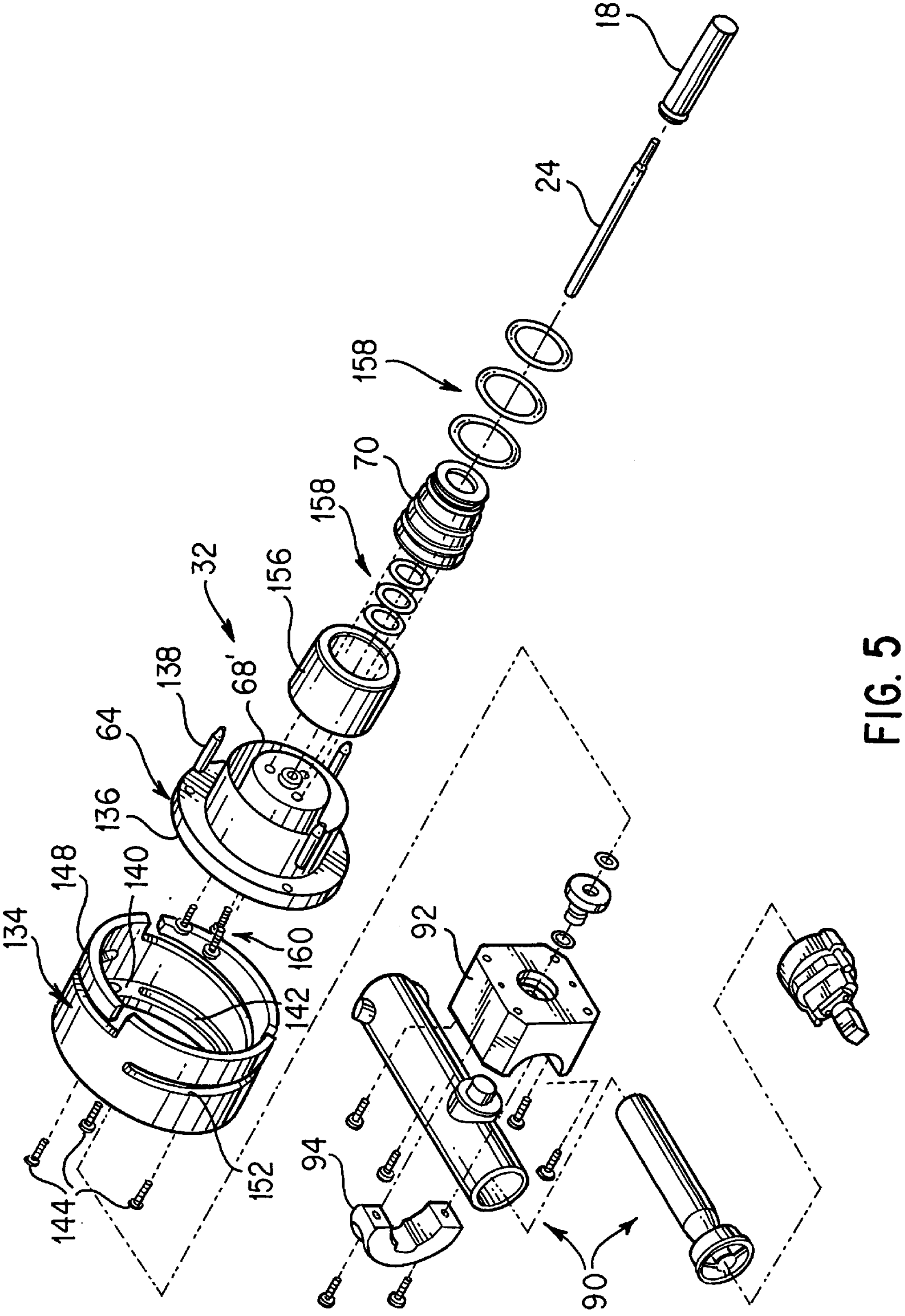
FIG. 5 is an exploded perspective view of the embodiment of FIG. 1.

An embodiment for allowing axial adjustment of the ends of the gas tube and the sample injection tube relative to the load coil and the plasma is shown in FIGS. 3, 4 and 5. The basic configuration is the same as for the embodiment of FIG. 1, with the numerals being the same where appropriate. Some features are not described again in detail as they are substantially the same with the same functions as for FIG. 1. Thus a load coil 12 is mounted in an enclosed housing 14, the coil being receptive of radio frequency energy. A gas tube 18 extends to the coil where a plasma 22 is formed, and a sample injector tube 24 may be positioned coaxially. Optionally, an intermediate tube 24 may also be disposed coaxially. The tubes are incorporated into a mounting assembly 32 which engages with a housing assembly 34 that includes a housing wall 36. A ring shaped receptacle 40 is affixed outside the housing wall. Finger rings 46 or the like are retained in annular slots 42 in the receptacle.

For the housing assembly 34, a first gas block 48 has a means for attachment 49 to the wall 36, the gas block having outer gas passages 52, 58 receptive of gases from sources (not shown) in the same manner as for the embodiment of FIG. 1. The mounting assembly 32 includes a mounting member 64 configured to fit on the receptacle 40. A contacting band 68' (elongated as described below) inserts between the finger rings for electrical contact. A second gas block 70 is affixed coaxially to the mounting member 64, with the gas tube 18 held therein with o-rings 74. The second block has inner gas passages 78, 82 as shown and explained for FIG. 1. The injector tube 24, if used, is retained coaxially through the mounting member 64 and the inner block 70 to extend through a auxiliary tube 28 to the coil 12. The second block 70 is configured to fit into the first gas block 48, with the inner passages aligned with the outer passages to convey the respective gases and sample into the tubes. A nebulizer assembly 90, or other sample injector system, is also the same as for the previous embodiment with similar components, as is a spark plasma ignitor (not shown).

According to the present embodiment, the mounting assembly 32 is positionable axially so as to allow selective positioning of the tube ends with respect to the coil 12 and plasma 22. The attachment of the first gas block 48 is by a holding means 49 that holds the first gas block to the housing wall in a fixed position rotationally with freedom of axial positioning relative to the housing wall. In the present example, this is achieved with arcuately spaced holding screws 120 (one shown) threaded into the wall 36. The screws pass through respective bores 122 in the first gas block, the bores allowing a loose, sliding fit. At or near the end of each bore toward the coil, a shoulder 124 stops the block against the screw head 126 at an extended position away from the wall. A spring 128 on the screw is compressed between the head and a second shoulder 130 at a narrowing of the bore towards the wall, to urge the second gas block towards the wall and axially to a seating position on the second gas block 70 independently of the axial positioning 132 of the mounting assembly, such that the inner passage remains aligned axially with the outer passage (as in FIG. 1).

As stated, the engagement of the mounting assembly on the housing assembly allows selective axial positioning 132. To maintain electrical contact, the slot 42 in the receptacle and the band 68' from the mounting member each are elongated cooperatively in an axial direction (parallel to the axis 38) so as to electrical contact through the range of positioning.

The axial positioning may be effected in any desired manner, such as a simple sliding fit of the mounting member over the receptacle, optionally with holding screws that for tightening in the selected position. However, in a preferable aspect, positioning is achieved with more precision by a rotation. For this, the mounting member 64 has a flange 136, and the engagement means comprises a coupling ring 134 fitted over the flange.

The receptacle 40 has at least one hole 137 therein aligned parallel to the axis 38 and opening outwardly from the housing. A headless pin 138 for each hole is affixed to the flange so that each pin inserts slidingly through a corresponding hole, thereby allowing the axial positioning while preventing relative rotation of the mounting member and the receptacle.

The coupling ring 134 has a radially inward flange 140 having a plurality of partial annular slots 142 arcuately spaced therein. For each slot a bolt 144 with a head 145 is affixed to the mounting flange 136. The bolts in the slots retain the coupling ring to the mounting member while allowing a freedom in a range of relative rotational positioning.

The coupling ring has a skirt 148 with an inwardly facing edge 150 and a plurality of slanted slots 152 arcuately spaced in the skirt and opening 153 at the inward edge (FIG. 4). For each such slot a post 154 is affixed to the outer cylindrical surface of the receptacle 40 with each post extending into and preferably through a slanted slot. Thus the coupling ring, along with the mounting assembly, is removable from the receptacle and its posts for the removable engagement, and rotation of the coupling ring on the receptacle with the posts effects the axial positioning.

As with the previous embodiment, the mounting member has a tubular protrusion 102' projecting over the injector tube in the gas tube, the protrusion having an axial bore 104 with a sufficiently high ratio L/D of length L to diameter D to provide a wave guide beyond cutoff for radio frequency shielding. In the present embodiment the mounting member and the receptacle advantageously are configured cooperatively for the tubular protrusion to fit loosely in the receptacle, thereby allowing room for the axial adjustment. A bearing cylinder 156 of low friction material (FIG. 5 only) may be used to facilitate rotation of the protrusion 102' in the receptacle 40. O-rings 158 have the same function as o-rings 72,76,86,88 of FIG. 1. Screws 160 the gas block 70. A nebulizer assembly 90 is held on with a bracket 92,94 as in FIG. 1.

Also, as with the previous embodiment, a spark or high frequency starter 109 is connected via a lead 113 to a spring clip 110 mounted to the gas block by a screw. Upon engagement of the mounting assembly, the clip contacts a metal contact 114 imbedded in or on the conduit wall.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A mounting apparatus for an induction coupled plasma generator, comprising:

a housing assembly comprising a housing formed of a housing wall with a wall opening therein, a load coil mounted in the housing and having an axis extending through the wall opening, a receptacle affixed to the housing wall essentially outside of the housing and having a central opening aligned with the wall opening, an annular first electrical contact element affixed to the receptacle, a first gas block with a central aperture therethrough, and attachment means for attaching the first gas block to the housing wall with the central aperture aligned with the central opening, the first gas block having an outer passage therein receptive of a plasma forming gas and extending to the central aperture, the load coil being receptive of radio frequency energy, and the housing wall, the receptacle and the first contact element being electrically conductive and in mutual electrical contact;

a mounting assembly comprising a mounting member configured to fit to the receptacle, an annular second electrical contact element affixed to the mounting member, a second gas block affixed to the mounting member and configured to fit into the first gas block in the central aperture, and a gas tube affixed to the second gas block to extend therefrom, the second gas block having an inner passage extending therethrough into the gas tube, and the mounting member and the second contact element being electrically conductive and in mutual electrical contact; and engagement means for removable engagement of the mounting assembly to the housing assembly, the housing assembly and the mounting assembly being configured cooperatively such that, with engagement, the mounting member is fitted to the receptacle, the second gas block is fitted into the first gas block, the first contact element and the second contact element are in electrical contact, the gas tube extends coaxially to the load coil, the inner passage aligns with the outer passage to convey the plasma forming gas into the gas tube to the load coil, and the load coil and the gas tube are cooperatively positioned to effect a plasma by induction coupling of the plasma forming gas with the radio frequency energy.

2. The apparatus of claim 1 wherein the receptacle has an annular slot therein facing outwardly from the housing, the first contact element comprises a pair of opposing finger rings retained in the slot, and the second contact element comprises a contact band such that, with the mounting assembly engaged, the band is inserted between the finger rings so as to be electrically contacted thereby for radio frequency shielding.

3. The apparatus of claim 1 wherein the receptacle, the mounting member, the central aperture and the second gas block are cylindrical, and the engagement means comprises means for rotationally engaging the mounting member to the receptacle.

4. The apparatus of claim 1 wherein the mounting assembly further comprises a sample injector tube affixed through the mounting member so as to extend coaxially into the gas tube, the injector tube being receptive of sample material for injection into the plasma.

5. The apparatus of claim 4 wherein the mounting assembly further comprises an intermediate tube disposed coaxially between the gas tube and the injector tube such that the plasma forming gas is conveyed in the gas tube outside of the intermediate tube, the first gas block having an auxiliary outer passage therein receptive of an auxiliary gas and extending to the central aperture, and the second gas block having an auxiliary inner passage extending into the intermediate tube so that, with the mounting assembly engaged, the auxiliary inner passage aligns with the auxiliary outer passage to convey the auxiliary gas into the intermediate tube.

6. The apparatus of claim 4 wherein the mounting member has a tubular protrusion projecting over the injector tube in the gas tube, the protrusion having an axial bore with a sufficiently high ratio of length to diameter to provide a wave guide beyond cutoff for radio frequency shielding.

7. The apparatus of claim 4 wherein the mounting assembly further comprises means for retaining a sample source of sample material on the mounting member with the injector tube extending from the sample source so as to inject sample material into the plasma.

8. The apparatus of claim 7 wherein the sample source is a nebulizer.

9. The apparatus of claim 1 wherein:

the receptacle has an annular slot therein facing outwardly from the housing, the first contact element comprises a pair of opposing finger rings retained in the slot, and the second contact element comprises an annular band such that, with the mounting assembly engaged, the band is inserted between the finger rings so as to be electrically contacted thereby for radio frequency shielding;

the receptacle, the mounting member, the central aperture and the second gas block are cylindrical, and the engagement means comprises means for rotationally engaging the mounting member to the receptacle;

the mounting assembly further comprises a sample injector tube affixed through the mounting member so as to extend coaxially into the gas tube, the injector tube being receptive of sample material for injection into the plasma;

the mounting member has a tubular protrusion projecting over the injector tube in the gas tube, the protrusion having an axial bore with a sufficiently high ratio of length to diameter to provide a wave guide beyond cutoff for radio frequency shielding; and the mounting assembly further comprises means for retaining a nebulizer on the mounting member with the injector tube extending from the nebulizer so as to inject sample material into the plasma.

10. The apparatus of claim 9 wherein the mounting assembly further comprises an intermediate tube disposed coaxially between the gas tube and the injector tube such that the plasma forming gas is conveyed in the gas tube outside of the intermediate tube, the first gas block having an auxiliary outer passage therein receptive of an auxiliary gas and extending to the central aperture, and the second gas block having an auxiliary inner passage extending into the intermediate tube so that, with the mounting assembly engaged, the auxiliary inner passage aligns with the auxiliary outer passage to convey the auxiliary gas into the intermediate tube.

11. The apparatus of claim 1 wherein:

the engagement means comprises positioning means for selective axial positioning of the mounting assembly relative to the housing assembly, and rotation retaining means for retaining the mounting assembly in a fixed rotational position relative to the housing assembly, the first contact means and the second contact means being cooperative to remain in electrical contact independently of the axial positioning; and the attachment means comprises holding means for holding the first gas block to the housing wall in a fixed position rotationally with freedom of axial positioning relative to the housing wall, and urging means for urging the first gas block axially to a seating position on the second gas block independently of the axial positioning such that the inner passage remains aligned with the outer passage, whereby the positioning means provides for axial positioning of the gas tube relative to the load coil.

12. The apparatus of claim 11 wherein the receptacle has an annular slot therein facing outwardly from the housing, the first contact element comprises a pair of opposing finger rings retained in the slot, and the second contact element comprises a contact band such that, with the mounting assembly engaged, the band is inserted between the finger rings so as to be electrically contacted thereby for radio frequency shielding, the slot and the band each being elongated cooperatively in an axial direction so as to remain in electrical contact.

13. The apparatus of claim 11 wherein the receptacle, the mounting member, the central aperture and the second gas block are cylindrical, the engagement means comprises a coupling ring fitted on the mounting member, and a retainer for retaining the coupling ring on the mounting member with freedom of relative rotational positioning, and the positioning means comprises means for rotationally engaging the coupling ring with the receptacle for the selective axial positioning.

14. The apparatus of claim 13 wherein:

the mounting cylinder has a mounting flange for extending radially outward over the receptacle, with the coupling ring being fitted over the flange and having a skirt for extending over the receptacle;

the rotational retaining means comprises the receptacle having at least one hole therein parallel to the axis and opening outwardly from the housing, and at least one pin affixed to the flange such that each pin inserts slidingly into a corresponding hole; and the positioning means comprises slanted rotational engagement of the skirt to the receptacle for effecting the axial positioning of the mounting assembly to the housing assembly.

15. The apparatus of claim 14 wherein:

the coupling ring has a radially inward flange having a plurality of partial annular slots arcuately spaced therein, the retainer comprises a corresponding plurality of bolts affixed to the mounting flange, each bolt extending through an annular slot and having a head thereon for retaining the coupling ring coaxially to the mounting member with freedom of relative rotational positioning; and the rotational engagement comprises the skirt having an inwardly facing edge and a plurality of slanted slots arcuately spaced in the skirt and opening at the inward edge, and the retainer comprises a corresponding plurality of posts affixed to the mounting member with each post extending into a slanted slot, whereby the coupling ring is removable from the posts for the removable engagement, and rotation of the coupling ring on the mounting member with the posts effects the axial positioning.

16. The apparatus of claim 11 wherein the mounting assembly further comprises a sample injector tube affixed through the mounting member so as to extend coaxially into the gas tube, the injector tube having an inward end and being receptive of sample material for injection from the inward end into the plasma, whereby the positioning means further provides for axial positioning of the inward end relative to the plasma.

17. The apparatus of claim 16 wherein the mounting assembly further comprises an intermediate tube disposed coaxially between the gas tube and the injector tube such that the plasma forming gas is conveyed in the gas tube outside of the intermediate tube, the first gas block having an auxiliary outer passage therein receptive of an auxiliary gas and extending to the central aperture, and the second gas block having an auxiliary inner passage extending into the intermediate tube so that, with the mounting assembly engaged, the auxiliary inner passage aligns with the auxiliary outer passage to convey the auxiliary gas into the intermediate tube.

18. The apparatus of claim 17 wherein the mounting member has a tubular protrusion projecting over the injector tube in the gas tube, the protrusion having an axial bore with a sufficiently high ratio of length to diameter to provide a wave guide beyond cutoff for radio frequency shielding.

19. The apparatus of claim 18 wherein the mounting member and the receptacle are configured cooperatively for the tubular protrusion to fit loosely in the receptacle.

20. The apparatus of claim 16 wherein the mounting assembly further comprises means for retaining a sample source of sample material on the mounting member with the injector tube extending from the sample source so as to inject sample material into the plasma.

21. The apparatus of claim 20 wherein the sample source is a nebulizer.

22. The apparatus of claim 11 wherein the receptacle has an annular slot therein facing outwardly from the housing, the first contact element comprises a pair of opposing finger rings retained in the slot, and the second contact element comprises a contact band such that, with the mounting assembly engaged, the band is inserted between the finger rings so as to be electrically contacted thereby for radio frequency shielding, the slot and the band each being elongated cooperatively in an axial direction so as to remain in electrical contact;

the receptacle, the mounting member, the central aperture and the second gas blob are cylindrical, the engagement means comprises a coupling ring fitted on the mounting member, and a retainer for retaining the coupling ring on the mounting member with freedom of relative rotational positioning, and the positioning means comprises means for engaging the coupling ring with the receptacle for the selective axial positioning;

the mounting assembly further comprises a sample injector tube affixed through the mounting member so as to extend coaxially into the gas tube, the injector tube having an inward end and being receptive of sample material for injection from the inward end into the plasma, whereby the positioning means further provides for axial positioning of the inward end relative to the plasma;

the mounting assembly further comprises an intermediate tube disposed coaxially between the gas tube and the injector tube such that the plasma forming gas is conveyed in the gas tube outside of the intermediate tube, the first gas block having an auxiliary outer passage therein receptive of an auxiliary gas and extending to the central aperture, and the second gas block having an auxiliary inner passage extending into the intermediate tube so that, with the mounting assembly engaged, the auxiliary inner passage aligns with the auxiliary outer passage to convey the auxiliary gas into the intermediate tube;

the mounting member has a tubular protrusion projecting over the injector tube in the gas tube, the protrusion having an axial bore with a sufficiently high ratio of length to diameter to provide a wave guide beyond cutoff for radio frequency shielding, the mounting member and the receptacle being configured cooperatively for the tubular protrusion to fit loosely in the receptacle; and the mounting assembly further comprises means for retaining a nebulizer on the mounting member with the injector tube extending from the nebulizer so as to inject sample material into the plasma.

23. The apparatus of claim 22 wherein:

the mounting cylinder has a mounting flange for extending radially outward over the receptacle, with the coupling ring being fitted over the flange and having a skirt for extending over the receptacle;

the rotational retaining means comprises the receptacle having at least one hole therein parallel to the axis and opening outwardly from the housing, and at least one pin affixed to the flange such that each pin inserts slidingly into a corresponding hole; and the positioning means comprises slanted rotational engagement of the skirt to the receptacle for effecting the axial positioning of the mounting assembly to the housing assembly;

the coupling ring has a radially inward flange having a plurality of partial annular slots arcuately spaced therein, the retainer comprises a corresponding plurality of bolts affixed to the mounting flange, each post extending through a partial annular slot and having a head thereon for retaining the coupling ring coaxially to the mounting member with freedom of relative rotational positioning; and the rotational engagement comprises the skirt having an inwardly facing edge and a plurality of slanted slots arcuately spaced in the skirt and opening at the inward edge, and the retainer comprises a corresponding plurality of posts affixed to the mounting member with each post extending into a slanted slot, whereby the coupling ring is removable from the posts for the removable engagement, and rotation of the coupling ring on the mounting member with the posts effects the axial positioning.

24. A mounting assembly for mounting onto a housing assembly of an induction coupled plasma generator, the housing assembly including a housing formed of a housing wall with a wall opening therein, a load coil mounted in the housing and having an axis extending through the wall opening, a receptacle affixed to the housing wall essentially outside of the housing and having a central opening aligned with the wall opening, an annular first electrical contact element affixed to the receptacle, a first gas block with a central aperture therethrough, and attachment means for attaching the first gas block to the housing wall with the central aperture aligned with the central opening, the first gas block having an outer passage therein receptive of a plasma forming gas and extending to the central aperture, the load coil being receptive of radio frequency energy, and the housing wall, the receptacle and the first contact element being electrically conductive and in mutual electrical contact;

wherein the mounting assembly comprises:

a mounting assembly comprising a mounting member configured to fit to the receptacle, an annular second electrical contact element affixed to the mounting member, a second gas block affixed to the mounting member and configured to fit into the first gas block in the central aperture, a gas tube affixed to the second gas block to extend therefrom, and engagement means for removable engagement of the mounting assembly to the housing assembly, the second gas block having an inner passage extending therethrough into the gas tube, and the mounting member and the second contact element being electrically conductive and in mutual electrical contact;

the engagement means comprising the housing assembly and the mounting assembly being configured cooperatively such that, with engagement, the mounting member is fitted to the receptacle, the second gas block is fitted into the first gas block, the first contact element and the second contact element are in electrical contact, the gas tube extends coaxially to the load coil, the inner passage aligns with the outer passage to convey the plasma forming gas into the gas tube to the load coil, and the load coil and the gas tube are cooperatively positioned to effect a plasma by induction coupling of the plasma forming gas with the radio frequency energy.

25. The assembly of claim 24 wherein the receptacle has an annular slot therein facing outwardly from the housing, the first contact element comprises a pair of opposing finger rings retained in the slot, and the second contact element comprises a contact band such that, with the mounting assembly engaged, the band is inserted between the finger rings so as to be electrically contacted thereby for radio frequency shielding.

26. The assembly of claim 24 wherein the receptacle, the mounting member, the central aperture and the second gas block are cylindrical, and the engagement means comprises means for rotationally engaging the mounting member to the receptacle.

27. The assembly of claim 24 wherein the mounting assembly further comprises a sample injector tube affixed through the mounting member so as to extend coaxially into the gas tube, the injector tube being receptive of sample material for injection into the plasma.

28. The assembly of claim 27 wherein the mounting assembly further comprises an intermediate tube disposed coaxially between the gas tube and the injector tube such that the plasma forming gas is conveyed in the gas tube outside of the intermediate tube, the first gas block having an auxiliary outer passage therein receptive of an auxiliary gas and extending to the central aperture, and the second gas block having an auxiliary inner passage extending into the intermediate tube so that, with the mounting assembly engaged, the auxiliary inner passage aligns with the auxiliary outer passage to convey the auxiliary gas into the intermediate tube.

29. The assembly of claim 27 wherein the mounting member has a tubular protrusion projecting over the injector tube in the gas tube, the protrusion having an axial bore with a sufficiently high ratio of length to diameter to provide a wave guide beyond cutoff for radio frequency shielding.

30. The assembly of claim 27 wherein the mounting assembly further comprises means for retaining a sample source of sample material on the mounting member with the injector tube extending from the sample source so as to inject sample material into the plasma.

31. The assembly of claim 30 wherein the sample source is a nebulizer.

32. The assembly of claim 24 wherein:

the receptacle has an annular slot therein facing outwardly from the housing, the first contact element comprises a pair of opposing finger rings retained in the slot, and the second contact element comprises an annular band such that, with the mounting assembly engaged, the band is inserted between the finger rings so as to be electrically contacted thereby for radio frequency shielding;

the receptacle, the mounting member, the central aperture and the second gas block are cylindrical, and the engagement means comprises means for rotationally engaging the mounting member to the receptacle;

the mounting assembly further comprises a sample injector tube affixed through the mounting member so as to extend coaxially into the gas tube, the injector tube being receptive of sample material for injection into the plasma;

the mounting member has a tubular protrusion projecting over the injector tube in the gas tube, the protrusion having an axial bore with a sufficiently high ratio of length to diameter to provide a wave guide beyond cutoff for radio frequency shielding; and the mounting assembly further comprises means for retaining a nebulizer on the mounting member with the injector tube extending from the nebulizer so as to inject sample material into the plasma.

33. The assembly of claim 32 wherein the mounting assembly further comprises an intermediate tube disposed coaxially between the gas tube and the injector tube such that the plasma forming gas is conveyed in the gas tube outside of the intermediate tube, the first gas block having an auxiliary outer passage therein receptive of an auxiliary gas and extending to the central aperture, and the second gas block having an auxiliary inner passage extending into the intermediate tube so that, with the mounting assembly engaged, the auxiliary inner passage aligns with the auxiliary outer passage to convey the auxiliary gas into the intermediate tube.

34. The assembly of claim 24 wherein:

the engagement means comprises positioning means for selective axial positioning of the mounting assembly relative to the housing assembly, and rotation retaining means for retaining the mounting assembly in a fixed rotational position relative to the housing assembly, the first contact means and the second contact means being cooperative to remain in electrical contact independently of the axial positioning; and the attachment means comprises holding means for holding the first gas block to the housing wall in a fixed position rotationally with freedom of axial positioning relative to the housing wall, and urging means for urging the first gas block axially to a seating position on the second gas block independently of the axial positioning such that the inner passage remains aligned with the outer passage, whereby the positioning means provides for axial positioning of the gas tube relative to the load coil.

35. The assembly of claim 34 wherein the receptacle has an annular slot therein facing outwardly from the housing, the first contact element comprises a pair of opposing finger rings retained in the slot, and the second contact element comprises a contact band such that, with the mounting assembly engaged, the band is inserted between the finger rings so as to be electrically contacted thereby for radio frequency shielding, the slot and the band each being elongated cooperatively in an axial direction so as to remain in electrical contact.

36. The assembly of claim 34 wherein the receptacle, the mounting member, the central aperture and the second gas block are cylindrical, the engagement means comprises a coupling ring fitted on the mounting member, and a retainer for retaining the coupling ring on the mounting member with freedom of relative rotational positioning, and the positioning means comprises means for rotationally engaging the coupling ring with the receptacle for the selective axial positioning.

37. The assembly of claim 36 wherein:

the mounting cylinder has a mounting flange for extending radially outward over the receptacle, with the coupling ring being fitted over the flange and having a skirt for extending over the receptacle;

the rotational retaining means comprises the receptacle having at least one hole therein parallel to the axis and opening outwardly from the housing, and at least one pin affixed to the flange such that each pin inserts slidingly into a corresponding hole; and the positioning means comprises slanted rotational engagement of the skirt to the receptacle for effecting the axial positioning of the mounting assembly to the housing assembly.

38. The assembly of claim 37 wherein:

the coupling ring has a radially inward flange having a plurality of partial annular slots arcuately spaced therein, the retainer comprises a corresponding plurality of bolts affixed to the mounting flange, each bolt extending through an annular slot and having a head thereon for retaining the coupling ring coaxially to the mounting member with freedom of relative rotational positioning, and the retainer further comprises a corresponding plurality of arcuately spaced posts affixed circumferentially to the mounting member; and the rotational engagement comprises the skirt having an inwardly facing edge and a plurality of slanted slots arcuately spaced in the skirt and opening at the inward edge, the slanted slots being receptive of the posts for engagement thereof, whereby the coupling ring is removable from the posts for the removable engagement, and rotation of the coupling ring on the mounting member with the posts effects the axial positioning.

39. The assembly of claim 34 wherein the mounting assembly further comprises a sample injector tube affixed through the mounting member so as to extend coaxially into the gas tube, the injector tube having an inward end and being receptive of sample material for injection from the inward end into the plasma, whereby the positioning means further provides for axial positioning of the inward end relative to the plasma.

40. The assembly of claim 39 wherein the mounting assembly further comprises an intermediate tube disposed coaxially between the gas tube and the injector tube such that the plasma forming gas is conveyed in the gas tube outside of the intermediate tube, the first gas block having an auxiliary outer passage therein receptive of an auxiliary gas and extending to the central aperture, and the second gas block having an auxiliary inner passage extending into the intermediate tube so that, with the mounting assembly engaged, the auxiliary inner passage aligns with the auxiliary outer passage to convey the auxiliary gas into the intermediate tube.

41. The assembly of claim 40 wherein the mounting member has a tubular protrusion projecting over the injector tube in the gas tube, the protrusion having an axial bore with a sufficiently high ratio of length to diameter to provide a wave guide beyond cutoff for radio frequency shielding.

42. The assembly of claim 41 wherein the mounting member and the receptacle are configured cooperatively for the tubular protrusion to fit loosely in the receptacle.

43. The assembly of claim 39 wherein the mounting assembly further comprises means for retaining a sample source of sample material on the mounting member with the injector tube extending from the sample source so as to inject sample material into the plasma.

44. The assembly of claim 43 wherein the sample source is a nebulizer.

45. The assembly of claim 34 wherein the receptacle has an annular slot therein facing outwardly from the housing, the first contact element comprises a pair of opposing finger rings retained in the slot, and the second contact element comprises a contact band such that, with the mounting assembly engaged, the band is inserted between the finger rings so as to be electrically contacted thereby for radio frequency shielding, the slot and the band each being elongated cooperatively in an axial direction so as to remain in electrical contact;

the receptacle, the mounting member, the central aperture and the second gas block are cylindrical, the engagement means comprises a coupling ring fitted on the mounting member, and a retainer for retaining the coupling ring on the mounting member with freedom of relative rotational positioning, and the positioning means comprises means for engaging the coupling ring with the receptacle for the selective axial positioning;

the mounting assembly further comprises a sample injector tube affixed through the mounting member so as to extend coaxially into the gas tube, the injector tube having an inward end and being receptive of sample material for injection from the inward end into the plasma, whereby the positioning means further provides for axial positioning of the inward end relative to the plasma;

the mounting assembly further comprises an intermediate tube disposed coaxially between the gas tube and the injector tube such that the plasma forming gas is conveyed in the gas tube outside of the intermediate tube, the first gas block having an auxiliary outer passage therein receptive of an auxiliary gas and extending to the central aperture, and the second gas block having an auxiliary inner passage extending into the intermediate tube so that, with the mounting assembly engaged, the auxiliary inner passage aligns with the auxiliary outer passage to convey the auxiliary gas into the intermediate tube;

the mounting member has a tubular protrusion projecting over the injector tube in the gas tube, the protrusion having an axial bore with a sufficiently high ratio of length to diameter to provide a wave guide beyond cutoff for radio frequency shielding, the mounting member and the receptacle being configured cooperatively for the tubular protrusion to fit loosely in the receptacle; and the mounting assembly further comprises means for retaining a nebulizer on the mounting member with the injector tube extending from the nebulizer so as to inject sample material into the plasma.

46. The assembly of claim 45 wherein:

the mounting cylinder has a mounting flange for extending radially outward over the receptacle, with the coupling ring being fitted over the flange and having a skirt for extending over the receptacle;

the rotational retaining means comprises the receptacle having at least one hole therein parallel to the axis and opening outwardly from the housing, and at least one pin affixed to the flange such that each pin inserts slidingly into a corresponding hole; and the positioning means comprises slanted rotational engagement of the skirt to the receptacle for effecting the axial positioning of the mounting assembly to the housing assembly;

the coupling ring has a radially inward flange having a plurality of partial annular slots arcuately spaced therein, the retainer comprises a corresponding plurality of bolts affixed to the mounting flange, each bolt extending through a partial annular slot and having a head thereon for retaining the coupling ring coaxially to the mounting member with freedom of relative rotational positioning, and the retainer further comprises a corresponding plurality of arcuately spaced posts affixed circumferentially to the mounting member; and the rotational engagement comprises the skirt having an inwardly facing edge and a plurality of slanted slots arcuately spaced in the skirt and opening at the inward edge, the slanted slots being receptive of the posts for engagement thereof whereby the coupling ring is removable from the posts for the removable engagement, and rotation of the coupling ring on the mounting member with the posts effects the axial positioning.

* * * * *